United States Patent [19]

Lim et al.

[11] 4,325,845

[45] Apr. 20, 1982

[54] ZEOLITE CATALYSTS AND METHOD OF PRODUCING THE SAME

[75] Inventors: John Lim, Anaheim; Michael Brady, Studio City, both of Calif.

[73] Assignee: Filtrol Corporation, Los Angeles, Calif.

[21] Appl. No.: 92,722

[22] Filed: Nov. 9, 1979

[51] Int. Cl.³ ............................................. B01J 29/08
[52] U.S. Cl. ............................... 252/455 Z; 252/451
[58] Field of Search ........................... 252/451, 455 Z

[56] References Cited

U.S. PATENT DOCUMENTS

| | | |
|---|---|---|
| 3,262,890 | 7/1966 | Mitchell et al. ................ 252/455 Z |
| 3,275,571 | 9/1966 | Mattox ................................. 252/451 |
| 3,296,151 | 1/1967 | Heinze et al. .................... 252/455 Z |
| 3,352,796 | 11/1967 | Kimberlin, Jr. et al. ....... 252/455 Z |
| 3,449,265 | 6/1969 | Gladrow et al. ................ 252/455 Z |
| 4,144,194 | 3/1979 | Guidry ................................. 252/451 |

*Primary Examiner*—Carl F. Dees
*Attorney, Agent, or Firm*—Philip Subkow; Bernard Kriegel

[57] ABSTRACT

This invention relates to a method of producing a zeolite containing cracking catalyst by employing a sodium silicate derived silica gel in combination with clay to form a catalyst having a good attrition resistance, low carbon, and hydrogen forming properties.

13 Claims, No Drawings

ZEOLITE CATALYSTS AND METHOD OF PRODUCING THE SAME

BACKGROUND OF THE INVENTION

A well known type of cracking catalyst is one formed by spray drying a mixture of an exchanged zeolite of the faujasite type, e.g. Y type of suitable low sodium content with peptized pseudoboehmite and clay. These are usually marketed as microspheres of about 50 to 70 micron average diameter. One problem associated with such catalysts is the nature of the abrasion resistance of the microspheres.

In order to improve the resistance to abrasion (for example as measured by its Abrasion Index by the test procedures described in Secor, et al, U.S. Pat. No. 4,010,116) of the above mixtures, various expedients have been proposed. These include the addition of crystalline silicate known as SMM (see Secor, et al, supra), ammonium polysilicates (see Lim, et al, U.S. Pat. No. 4,086,187), sodium silicate in limited quantities (see Lim, et al, Ser. No. 896,318; filed Apr. 14, 1978) and the in situ encapsulation of the zeolite silica with a silica-alumina gel (see Alfandi, et al, U.S. Pat. No. 4,412,995).

It has been shown that the thermal stability and the attrition resistance of catalysts composed of a zeolite and a matrix including clay is improved by the addition of alumina specifically if it be a suitably peptized pseudoboehmite added to the matrix prior to spray drying. Reference may be had to the copending application, Ser. No. 3,407, now U.S. Pat. No. 4,206,085 which one of us is a joint applicant.

Various patents relating to the use of silica-alumina sols and gels and sodium silicate in zeolite compositions for various purposes have been issued. Reference may be had to the following U.S. patents: Gladrow, No. 3,609,103, No. 3,449,265; Robbins, No. 3,558,476; Kiovsky, No. 3,641,090; Conde, No. 3,624,003; Hoffman, No. 3,972,835; Drost, No. 3,446,645; Scott, No. 3,451,948.

One of the inherent properties of catalysts of the aforesaid type is the tendency of the catalyst to promote the conversion of the petroleum fraction charged to the cracking process into coke. The coke deposits on the catalyst and deactivates the catalyst. Such catalysts also promote the production of gases such as hydrogen. Together these properties of the catalyst result in a decrease in the yield of hydrocarbons in the gasoline range.

While some coke is desirable to be deposited on the catalyst in order that it may permit the generation of a sufficiently high temperature in the regenerators, to produce the necessary reactivation of the catalyst by burning off the carbon, the excessive carbon deposit does introduce a problem in the regenerator as is well known in the prior art.

The hydrogen formation by a catalyst is associated with the dehydrogenation process and influences the production of unsaturated light hydrocarbons.

The cracking activity of a catalyst is determined on a laboratory bench scale by microactivity tests. As used in the following Examples 1-4, it is of the type reported in the Oil and Gas Journal issues of 1966, Volume 64, Number 39, Pages 84, 85, modified as reported in the issue of Nov. 22, 1971, Pages 60 through 63. In the following examples, the conditions were as follows:

The calcined catalyst formed into a pellet was first steamed at temperatures and times specified below and then used in cracking of a petroleum fraction under the following conditions. Oil charge was a wide boiling range high sulfur feed stock (boiling range about 430° to 1000° F.). The catalyst to oil ratio equaled 2.92. The weight hourly space velocity equaled 16.45 grams of oil per gram of catalyst per hour. The temperature of the reactor was 910°. The percent conversion is reported as the volume of liquid condensate product of boiling point range of up to 421° F. based on the volume of liquid charge. The percent conversion after the catalyst is calcined in air three hours at 1050° F. and steamed for two hours at 1450° F. and then subjected to the above test conditions, is termed M activity. When the calcined sample is steamed at 1500° F. for two hours, it is termed the S activity. When the calcined sample is first steamed for two hours at 1550° F., it is termed S+ activity.

The carbon producing property of a catalyst depends upon the activity of the catalyst measured by the percent conversion of the stock, for example as measured by said test. The greater the percent conversion, the greater is the percent of the feed stock that appears as carbon. The hydrogen production property of a catalyst is substantially independent of the percent conversion up to a limited upper value of M activity of about 75% as measured by the percent conversion in the above tests and at higher values of conversion increases rapidly with the percent conversion.

As a measure of the carbon conversion properties of a fresh catalyst, and to permit comparison between catalysts of different activity, the carbon conversion tendency is measured by its carbon production factor (CPF).

The carbon production factor is obtained by measuring the volume percent conversion in the above test ($C_v$) and the weight percent of carbon ($C_w$) deposited on the catalyst in the above test, based on the weight of the charge. For every conversion by the above test, which is more than 8% and less than 75.5% volume percent of the charge, the carbon production factor (CPF) is evaluated by the following equation (I):

$$CPF = C_w/e^k \qquad \text{Equation I}$$

wherein:

$k = (C_v - 36)/36$

At values of conversion equal to or greater than 75.5%, and equal to or less than 82%, volume percent conversion, the carbon production factor (CPF) is evaluated by the following equation (II):

$$CPF = C_w/e^k \qquad \text{Equation II}$$

where:

$k = (C_v - 69)/5.9$

The tendency of the catalyst to produce hydrogen is evaluated by its gas production factor (GPF). This is obtained by measuring the weight of hydrogen produced as a percent of the weight of charge in the above test ($H_w$).

For conversions of less than 73.3% by volume, the gas production factor is the weight percent of hydrogen as based upon the weight of the charge divided by 0.033.

For conversions equal to or greater than 73.3% and less than 78.0%, volume percent conversion, the gas production factor is given by the following equation (III):

$$GPF = Hw/k \qquad \text{Equation III}$$

where:

$k = 0.0011\, Cv - 0.0476$

The greater the carbon production factor, the greater is the tendency of the catalyst to produce carbon and the greater the gas production factor, the greater is the percent of the charge which will be converted into hydrogen, that is the greater is the dehydrogenation property of a catalyst.

A desirable attrition index (AI) and a Carbon Production factor (CPF), and a Gas Production factor (GPF) is an AI (Attrition Index) less than about 24; a GPF of less than about 0.96; and a CPF of less than about 1.1 at a M activity of more than about 60% and preferably at about 65% or higher.

An alternative microactivity test method employs the under 80 mesh microspheres produced as described below, and calcined for three (3) hours at 1050° F. They are contained as a loose body in a reaction chamber, preheated to 900° F. and purged with helium. The liquid feed (D-32 ASTM Standard micro-activity feed) is passed through a preheating section, held at 900° F., and the vaporized oil passed downward through the body of the catalyst at a weight hourly weight ratio of 16. The resultant vapors are condensed in an ice bath. The uncondensed vapors and gases are separated. The body of the catalyst is purged with helium through the above condensation and separation system. The liquid condensate and the gas are analyzed by a gas chromatograph and the coke is analyzed by combustion with oxygen to form the $CO_2$ which is measured.

The conversion (Cv) which would be produced by employing the same catalyst prepared by the steaming procedure in connection with tthe pellet test described above, is related to the volume percent conversion (Cv)' in the microsphere test described above by the following relation.

$$C_v = (0.973) \times (C_v)' + 0.32 \qquad \text{Equation IV}$$

The weight percent of the carbon (Cw) by the above pellet test, is related to the weight percent of carbon $(Cw)^1$ by the microsphere test by the following relation:

$$Cw = (0.903) \times (C_w) - 0.0444 \qquad \text{Equation V}$$

The weight percent of Hydrogen (HW) according to the above pellet test, is related to the weight percent of hydrogen yield (H)' obtained by the above microsphere by the following relation:

$$Hw = (1.02) \times (Hw)' + 0.0009 \qquad \text{Equation VI}$$

The resultant values of $C_v$, Cw, and Hw are used to evaluate the CPF and GPF according to Equations I, II, or III.

STATEMENT OF THE INVENTION

We have discovered that in the above catalysts which contain alumina as a separate part of the matrix, particularly where the alumina is derived from active alumina such as pseudobeohmite, the alumina is a material factor in the generation of coke, and hydrogen. It is a material factor in producing catalysts of high CPF and is also a material factor in producing a catalyst of high GPF.

We have found that by eliminating the alumina, the coke making and hydrogen generation property of the catalyst will be substantially improved, that it will result in a catalyst of lower value of GPF and CPF. We have also discovered that this may be accomplished without impairing the attrition resistance properties of the catalyst. We have found that this improvement may be attained by substituting for the alumina hydrate in the slurry an ammonium ion buffered dispersion of sodium silicate provided that the ratio of the silicate calculated as $SiO_2$ is maintained within substantially narrowly defined limits.

The silicate is employed in the ratios in the range of about 13 to about 20% expressed as the equivalent $SiO_2$ based on the composite catalyst on a volatile free basis, for an Attrition Index of about 20% or less, for example, about 10 to about 20%.

The sodium silicate in our process is converted, in the presence of the clay, preferably ball clay, and zeolite, into a silica gel by adjustment of the pH through the medium of the ammonium ion and added acid. The resulting composition may be further exchanged, either prior to but preferably after spray drying, as for example, by ammonium or rare earth cations or both. The resulting catalysts produced by our process have a desirable attrition resistance and an improved GPF and CPF as compared with catalysts in which the attrition is attained by use of alumina, with or without supplements (see Secor, et al, and Lim, et al, spura).

We have found that we can thus compensate for the function of the omitted alumina hydrate and added conditioning agents such as used by Secor, et al or Lim, et al patents (supra), in producing a zeolite matrix complex of good attrition resistance.

We have found however that it makes a material difference in the activity, carbon forming and dehydrogenating effect of the catalyst depending on the sodium content of the zeolite which is combined with the sodium silicate prior to treatment with the buffered ammonium salt solution.

The relatively low sodium faujasite zeolites containing sodium equivalent to about 3% to about 6% $Na_2O$ of the zeolite on a volatile free basis, such as is produced by exchanging a NaY, with ammonium and is rare earth cations when combined with sodium silicate and treated with a buffered ammonium salt solution according to our invention and combined with a matrix will yield a catalyst of good attrition resistance but of poorer activity and inferior GPF and CPF. A corresponding treatment of a high sodium faujasite, for example, containing sodium equivalent to about 12% to about 15% of $Na_2O$ based on the Y zeolite on a volatile free basis, will produce a catalyst of similar attrition resistance but of much superior activity and GPF and CPF.

While the composite catalyst formed as described above employing a partially exchanged Y to be mixed with the silicate, in the form of spray dried microspheres are of inferior cracking catalytic activity, they may be used for other purposes where their absorbent and adsorbent and attrition resistant properties may be employed, for example, as dessicants to remove water from gases or for other purposes for which the molecular sieve Y zeolite has found utility. The attrition resistance of such microspheres is a highly useful property in uses where freability is an undesirable property, and the high attrition resistance of the microspheres of our invention is desirable.

The effect of the percent of a suitable alumina, for example, the type of alumina referred to as Type A, (see our copending application, Ser. No. 003,407, now U.S.

Pat. No. 4,206,085, incorporated herein by this reference) when suitably peptized and stabilized by the incorporation of the ammonium polysilicate as described in said copending application, Ser. No. 003,407, U.S. Pat. No. 4,206,085, and U.S. Pat. No. 4,086,187, on the attrition index, activity and CPF, and GPF is illustrated by Example 1.

EXAMPLE 1

A zeolite of the substantially pure (95% plus) faujasite-type ($SiO_2/Al_2O_3$ greater than 4.8) which had been washed to a pH of 10.5 was acidulated with sulfuric acid to a pH of 3.5 in a slurry containing 10% of the zeolite on a volatile free basis. It was then exchanged at ambient room temperature with ammonium sulfate in a weight ratio of 0.7 of the ammonium sulfate to 1.0 of the zeolite, volatile free. The exchanged slurry was filtered to a solid content of approximately 45%. The filter cake was reslurried to a 10% solid content as above, with rare earth sulfate solution employing the sulfate of about 10% [expressed as rare earth oxide (REO)] of the weight of the zeolite on a volatile free basis at a pH of 4.5. The mixture was held at ambient room temperature for 30 minutes to an hour after which it was filtered and washed until no sulfate was detectable in the washing solution.

The filter cake, in addition to the $SiO_2$ and $Al_2O_3$ of the zeolite values, whose ratios are stated above, had the following analysis:

| | | |
|---|---|---|
| $Na_2O$ | = | 4.23 wt.% |
| ReO | = | 10.2 wt.% |
| $NH_3$ | = | 4.20 wt.% |

The ReO (rare earth oxides) was determined by the standard gravimetric oxalate method.

The exchanged zeolite of Example 1 was combined in the manner described in said Pat. No. 4,086,186, with alumina of the type of pseudo-boehmite having a peptizeability index of above 0.5% according to the test described in Pat. No. 4,086,187 supra, acidified with formic acid as above, ball clay and ammonium polysilicate, made as described in said patent in various proportions. The compositions of the above compositions are tabulated in Table 1. The mixtures were spray dried and subjected to the activity tests and attrition tests as described above.

The observed data are tabulated in Table 1.

TABLE 1

| Catalyst Composition | % by wt. | | | | |
|---|---|---|---|---|---|
| Alumina | 10 | 20 | 30 | 40 | 50 |
| Ball Clay | 61.5 | 51.5 | 41.5 | 31.5 | 21.5 |
| Ammonium Polysilicate ($SiO_2$) | 10 | 10 | 10 | 10 | 10 |
| Zeolite, Ex. 1 | 18.5 | 18.5 | 18.5 | 18.5 | 18.5 |
| M% Activity | 70 | 72 | 69 | 67 | 69 |
| GPF | 1.2 | 1.3 | 1.6 | 1.0 | 1.7 |
| CPF | 1.4 | 1.6 | 1.7 | 1.5 | 1.6 |
| A.I. | 16 | 10 | 8 | 10 | 11 |

It will be observed that the attrition index (A.I.) of under 20 can be achieved by using the combination of the alumina and the ammonium polysilicate but that the M activity GPF is in excess of 1 and the CPF is also in excess of 1 when the percent conversion is about 70% or higher.

The omission of the alumina from a zeolite clay formulation results in an improvement in the CPF and the GPF but as we have found a limitation of the amount of the silicate is necessary to obtain the desired A.I. values.

EXAMPLE 2

A synthetic faujasite derived from clay containing about 88% of NaY of equivalent to about 14% $Na_2O$ on a volatile free basis and of $SiO_2/Al_2O_3$ ratio of 4.71 was mixed with sodium silicate. The sodium silicate composition, equivalent to $SiO_2$, equaled to 28.7% on a volatile free basis of the sodium silicate. To this mixture of the three components in a water slurry was thoroughly mixed as follows. The clay and the silicate, and water, were first thoroughly mixed for thirty minutes and then the faujasite was added slowly with vigorous agitation. The mixture was then milled in a colloid mill to a degree to raise the temperature of the slurry at least 15° F.

The slurry was then spray dried to form microspheres having an average diameter of from about 50 to about 70 microns and containing about 15% moisture. The spray dried microspheres were subjected to a post exchange to reduce the sodium content of the microspheres. The post exchange was made by reaction with a water solution of an $NH_4^+$.

The microspheres were mixed with a solution of $(NH_4)_2 SO_4$ and to establish a pH in the slurry of microspheres at a pH of about 4 to about 7.

The above treatment causes a gelling of the $SiO_2$ in-situ in the presence of the zeolite and clay which is intimately mixed with the gelled $SiO_2$.

The zeolite in the microspheres is then further exchanged with ammonium sulfate adjusting the mixture to a pH of 4 to 5 with sulfuric acid, the exchange taking place over a period of an hour. The slurry is then filtered and washed. The washing continued until the filtrate was sulfate free as shown by the barium chloride test.

The wet microspheres in the filter cake were dried in a 100° C. oven.

The above procedure was followed to form a number of samples in which the ratio of the ingredients employed above was as follows. Each of the samples were subjected to the above attrition test and the A.I. determined.

TABLE 2

| Sample | 1 | 2 | 3 | 4 | 5 |
|---|---|---|---|---|---|
| % Zeolite | 18.5 | 18.5 | 18.5 | 18.5 | 18.5 |
| % $SiO_2$ | 10.0 | 15.0 | 18.0 | 20.0 | 25.0 |
| % Clay | 71.5 | 66.5 | 63.5 | 61.5 | 56.5 |
| A.I. | 35 | 13 | 11 | 21 | 26 |

All percent by weight on a volatile free basis. The percent $SiO_2$ is the weight percent equivalent to the percent by weight of the above sodium silicate. The $Na_2O$ content of the oven dried samples in the above table were typically about 1% or less on a volatile free basis. A.I. is the attrition index of the oven dried samples.

It will be observed that the percent of the $SiO_2$ which is introduced as sodium silicate had a material influence on the attrition index of the post exchanged low sodium microspheres. The advantageous concentration of the equivalent value of the $SiO_2$ based on the composite catalyst on a volatile free basis, and the concentration which is our preferred embodiment is one which will yield A.I. of 22±2% or a lower attrition index.

As shown in the system of Example 4, this is about 13 to about 23% of the equivalent SiO₂.

It will be observed that included in the preparation of the samples of Example 4 was a thorough milling of the slurry of the composite prior to the spray drying of the slurry. The milling has the effect of reducing the particle size of the solid components of the spray slurry particularly the zeolite in the slurry.

The effect of milling on the improvement in the attrition resistance is increased when the milling is conducted on the zeolite prior to incorporating the zeolite in the slurry with the clay and the silicate. This is shown in Example 5.

EXAMPLE 3

A series of samples were made in the same manner as Example 2, with the following difference, only Sample 1, 2, and 3, contained 1.25 weight percent of tetrasodium pyrophosphate, on a volatile free basis based on the other solids in the slurry on a volatile free basis.

Sample 1, the mixture of the zeolite, silicate clay, tetrasodium pyrophosphate, were milled and processed as in Example 4.

Sample 2, the zeolite was milled in the same manner as was the slurry of Example 4, to a temperature rise of 15° F. and then mixed with clay, tetrasodium pyrophosphate and silicate and processed as in Example 4 and milled again as in Example 4.

Sample 3, only the zeolite was milled as in Sample 2, and the milled zeolite was mixed with the tetrasodium pyrophosphate, silicate, and clay, and processed as in Example 4.

Sample 4, was processed as Sample 3, except that the tetrasodium pyrophosphate was omitted.

Each of the exchanged and oven-dried as above Example 4 microspheres were tested for Attrition Index. The results are stated in Table 3.

The oven-dried microspheres of the above samples have the following A.I.

TABLE 3

| Sample | 1 | 2 | 3 | 4 |
|--------|---|---|---|---|
| A.I.   | 24 | 13 | 11 | 17 |

It will be seen that a substantial improvement in the A.I. is obtained where the zeolite is milled whether or not the spray slurry is also milled prior to spray drying, thus compare sample 1 with samples 2–4.

EXAMPLE 4

The catalyst formed found as in Sample 3, of Example 3, except that no tetrasodium pyrophosphate was employed, was spray dried. The microspheres after the post exchange with ammonium sulfate (two times) and filtration of the exchanged microspheres was slurried with rare earth sulfate solution to further reduce the sodium content of the spray dried microspheres. The post exchanged microspheres were filtered and washed sulfate free as evidenced by the barium chloride test on the filtrate. The post exchanged microspheres, Sample 1, were oven-dried as in Example 4 when analyzed had the following on a volatile free basis:

| | | |
|---|---|---|
| Na₂O | = | 0.69% |
| NH₃ | = | 0.43% |
| REO | = | 2.76% |

When evaluated, based on the zeolite content of 18.5%, the above valued are equal to:

| | | |
|---|---|---|
| Na₂O | = | 3.73% |
| ReO | = | 14.92% |
| NH₃ | = | 2.32% |

The above catalyst is herein referred to as Sample 1 of Example 4. The Attrition Index of Sample 1 was 16%.

Sample 2 was formed by the procedure of Sample 1, but after the exchange with the rare earth salt, it was dried and heated to about 1050° F. for two (2) hours in air and the cooled microspheres again re-exchanged with rare earth salt solution and filtered and washed, as in the case of Sample 1.

The re-exchanged microspheres were analyzed and the analysis on a volatile free basis was as follows:

| | | |
|---|---|---|
| Na₂O | = | 0.47% |
| ReO | = | 3.48% |
| NH₃ | = | 0.05% |

The Attrition Index was 11%.

The effect of the substitution of the alumina and ammonium polysilicate by the silica according to the process of our invention is evidenced by comparing the activities and the CPF and GPF of the two types of catalysts.

TABLE 4

| Example | 1 | 4(Sample 1) | 6(Sample 2) |
|---------|---|-------------|-------------|
| % Zeolite | 18.5 | 18.5 | 18.5 |
| % Ball Clay | 61.3 | 63.5 | 63.5 |
| % Alumina | 10 | 0 | 0 |
| % SiO₂ | 10 | 18 | 18 |
| Activity Volume % | 70% | 72% | 73% |
| G.P.F. | 1.2 | 0.7 | 1.3 |
| C.P.F. | 1.4 | 1.2 | 1.4 |
| A.I. | 16 | 16 | 11 |

The following Example 5 illustrates the inferior catalytical activity of the partially exchanged faujasite zeolite when used in place of the high sodium faujasite zeolites such as were employed in Example 2.

EXAMPLE 5

The exchanged zeolite of Example 1 was first calcined and the calcined zeolite was employed in the place of the sodium Y of Example 2 and simularly processed as in Example 2 except that the milling of the zeolite was carried out to raise the temperature by 20° F. The slurry which was spray dried contained, before drying, 10% SiO₂ equivalent to the sodium silicate, and clay 67% and 18% of the calcined exchanged zeolite all by weight of the composite catalyst on a volatile free basis. The catalyst analyzed as follows:

| | | |
|---|---|---|
| Na₂O | = | 0.24% |
| ReO | = | 2.20% |
| NH₃ | = | 0.39% | by weight on a volatile free basis.

It was submitted to the attrition test and microsphere micro activity test described above, employing steaming of the calcined catalyst at 1450° F. for two (2) hours.

The equivalent values were (see Equation IV, V, and VI):

| | | |
|---|---|---|
| Cv | = | 26.0% |
| GPF | = | 3.4 |
| CPF | = | 0.9 |
| A.I. | = | 4.4 |

The catalyst when compared with the catalyst of Sample 3 of Example 2, or Sample 1 of Example 4 has as good or even superior attrition index but compared with either the alumina containing catalyst of Example 1, or the alumina free catalyst of Sample 1 of Example 4, it is substantially inactive as a conversion catalyst and is a large coke maker.

The zeolite which is preferably incorporated into the catalyst of our invention is the substantially unexchanged sodium faujasite for example sodium Y of about 4 to about 6 $SiO_2/Al_2O_3$ molar ratio, that is one containing Na equivalent to about 12% to 15% of $Na_2O$ on a volatile free basis.

We may and preferably do use the zeolite in comminuted microcrystalline form as in the case of the milled zeolite which has been colloid milled to a 15° to 20° F. temperature rise as described above.

The zeolite or the zeolite and clay, preferably kaolin clay, is combined with sodium silicate in a slurry and dried to about 10 to 20% moisture content. Preferably the drying is by spray drying. The spray drying forms microspheres having an average diameter of from about 50 to about 70 microns and contain about 10 to 20% water, for example 15%. The dried or spray dried mixture is then mixed with a buffered solution of ammonium salt solution for example an ammonium sulfate solution at a pH of about 4 to about 7.

The treatment forms a $SiO_2$ gel which is intimately mixed with the zeolite and the clay.

Since it is desired that the sodium content of the composite catalyst containing the zeolite, clay and silicate derived silica gel be in the range of 1% and preferably as low as 0.7% expressed as $Na_2O$ on a volatile free basis, unless the zeolite had been previously exchanged to a suitably low sodium content before spray drying, the spray dried microspheres may be exchanged by mixing the microspheres with ammonium salt solution or with rare earth salt solutions or both employing, for example, the procedures described in the above Example 5 to the above levels of sodium content.

However, the zeolite may be exchanged for example, by the procedures shown in Examples 1–4 to a suitable level, or by pressure exchange for example, about 0.5 to about 5%.

The preferred ratios of the components are as follows:

The ratio of the silicate, expressed as the equivalent $SiO_2$, to the sodium of the sodium Y zeolite is preferably in the range of about 0.8 to about 1.2 parts by weight of the zeolite to 1 part by weight of the $SiO_2$ when combined in the catalyst composed of the zeolite, the silicate derived $SiO_2$ and clay. The preferred percent by weight of the $SiO_2$ equivalent to the percent weight of silicate in the slurry is preferably equivalent to from about 10% to about 20% of the weight of the composite catalyst on a volatile free basis.

The weight ratio of the zeolite and the clay in the composite catalyst is preferably in the range of about 10% to about 30% of the zeolite and about 50 to about 70% by weight of clay, preferably kaolin clay based on the composite catalyst on a volatile free basis.

The sodium content of the composite catalyst is preferably about 1% or less e.g. about 0.7% or less by weight expressed as $Na_2O$ on a volatile free basis.

The catalyst of our invention desirably has a M activity of 65% or more and desirably an attrition index of 20±2 or lower, desirably a GPF of 0.9±0.5 or lower and desirably a CPF of 1.1±0.1 or lower.

This is attained by excluding alumina and incorporating the silica generated $SiO_2$ gel produced by gelling a sodium silicate in the presence of a high sodium Y zeolite by a buffered ammonium salt solution to generate a $SiO_2$ gel in situ as described above.

We claim:

1. A process of forming a catalyst containing a sodium zeolite of the faujasite type which comprises mixing in a water slurry, a zeolite of the faujasite type containing from about 12 to about 15% sodium expressed as $Na_2O$, clay and sodium silicate, the weight ratio of the zeolite to the silica equivalent to the sodium silicate being in the range of about 0.8 to about 1.2 parts by weight of the zeolite to one part by weight of the $SiO_2$ on a volatile free basis, drying the mixture and mixing the mixture with an ammonium salt solution at a pH of about 4 to 7 to form a silica gel in situ in the mixture and drying the treated mixture.

2. A process of forming a catalyst containing a Y zeolite containing sodium equivalent to about 12% to about 15% of $Na_2O$ based on the zeolite on a volatile free basis, which comprises mixing in a water slurry, a Y zeolite containing sodium, equivalent to about 12% to about 15% of $Na_2O$ based on the weight of the zeolite on a volatile free basis clay and sodium silicate, the weight ratio of the zeolite to the silica equivalent to the sodium silicate being in the range of about 0.8 to about 1.2 parts by weight of the zeolite to one part by weight of the $SiO_2$ on a volatile free basis, drying the mixture, mixing the dried mixture with an ammonium salt solution at a pH of about 4 to 7 to form a silica gel in situ in the mixture and spray drying said mixture.

3. A process of forming a catalyst containing a sodium Y, as in claim 2, zeolite which comprises exchanging the sodium Y to reduce the sodium content of the Y zeolite to less than about 3% to about 6% by weight of the exchanged Y expressed as $Na_2O$ on a volatile free basis, mixing in said zeolite, clay and sodium silicate in water, the weight ratio of the zeolite to the silica equivalent to the sodium silicate being in the range of about 0.8 to about 1.2 parts by weight of the zeolite to one part by weight of the $SiO_2$ on a volatile free basis, drying the mixture and mixing the dried mixture with an ammonium salt solution at a pH of about 4 to 7 to form a silica gel in situ in the mixture and spray drying said mixture.

4. A process of forming a catalyst containing a Y zeolite, containing sodium equivalent to about 12% to about 15% of $Na_2O$ based on the zeolite on a volatile free basis, which comprises comminuting Y zeolite by milling the zeolite and mixing the milled Y zeolite in a water slurry, with clay and sodium silicate, the weight ratio of the zeolite to the silica equivalent to the sodium silicate being in the range of about 0.8 to about 1.2 facts by weight of the zeolite to one part by weight of the $SiO_2$ on a volatile free basis, drying the mixture and mixing the dried mixture with an ammonium salt solution at a pH of about 4 to 7 to form a silica gel in situ in the mixture and spray drying said mixture.

5. A process of forming a catalyst containing a sodium Y zeolite which comprises comminuting Y zeolite containing sodium equivalent to about 12% to about 15% of $Na_2O$ on a volatile free basis, by milling said zeolite, mixing in said communited Y zeolite, clay and sodium silicate in water, the weight ratio of the zeolite to the silica, equivalent to the sodium silicate being in the range of about 0.8 to about 1.2 parts by weight of the zeolite to one part by weight of the $SiO_2$ on a volatile free basis, milling said mixture, drying the mixture and mixing the dried mixture with an ammonium salt solution at a pH of about 4 to 7 to form a silica gel in situ in the mixture and spray drying said mixture.

6. A process of forming a catalyst containing a Y zeolite which comprises, exchanging a sodium Y zeolite to reduce the sodium content of the zeolite to or equivalent to about 3% to about 6% of the exchanged zeolite, expressed as $Na_2O$ on a volatile free basis, comminuting said Y zeolite, mixing in said communited Y zeolite, clay and sodium silicate in water, the weight ratio of the zeolite to the silica equivalent to the sodium silicate being in the range of about 0.8 to about 1.2 parts by weight of the zeolite to one part by weight of the $SiO_2$ on a volatile free basis, milling said mixture drying the mixture and mixing the dried mixture with an ammonium salt solution at a pH of about 4 to 7 to form a silica gel in situ in the mixture and spray drying said mixture.

7. A process of forming a catalyst containing a Y zeolite which comprises comminuting said Y zeolite containing sodium equivalent to about 12% to about 15% of $Na_2O$ on a volatile free basis by milling said zeolite, mixing said milled zeolite with clay and sodium silicate in water, the weight ratio of the zeolite to the silica equivalent to the sodium silicate being in the range of about 0.8 to about 1.2 parts by weight of the zeolite to one part by weight of the $SiO_2$ on a volatile free basis, drying the mixture, mixing said dried mixture with an ammonium salt solution at a pH of about 4 to 7 to form a silica gel in situ in the mixture and spray drying said mixture.

8. A process of forming a catalyst containing a sodium Y zeolite which comprises exchanging the sodium Y to reduce the sodium content of the Y zeolite to an amount equivalent about 3% to about 6% by weight of the zeolite expressed as $Na_2O$ on a volatile free basis, comminuting said zeolite by milling said zeolite, mixing in a water slurry, the comminuted zeolite, clay and sodium silicate, the weight ratio of the zeolite to the silica equivalent to the sodium silicate being in the range of about 0.9 to about 1.2 facts by weight by the zeolite to one part by weight of the $SiO_2$ on a volatile free basis, drying the mixture and mixing the dried mixture with an ammonium salt solution at a pH of about 4 to 7 to form a silica gel in situ in the mixture and spray drying said mixture.

9. A process of forming a catalyst containing a Y zeolite which comprises mixing in a water slurry, a Y zeolite containing sodium, equivalent to about 12% to about 15% of $Na_2O$ on a volatile free basis, clay and sodium silicate, the weight ratio of the zeolite to the silica equivalent to the sodium silicate being in the range of about 0.8 to about 1.2 parts by weight by the zeolite to one part by weight of the $SiO_2$ on a volatile free basis milling said mixture, drying the milled mixture to form mixing the dried mixture with an ammonium salt solution at a pH of about 4 to 7 to form a silica gel in situ in the mixture and spray drying said mixture.

10. A process of forming a catalyst containing a sodium Y zeolite which comprises exchanging the sodium Y to reduce the sodium content of the Y zeolite to less than about 5% by weight expressed as $Na_2O$ on a volatile free basis, mixing in a water slurry, said zeolite, clay and sodium silicate, the weight ratio of the zeolite to the silica equivalent to the sodium silicate, being in the range of about 0.8 to about 1.2 parts by weight of the zeolite to one part by weight of the $SiO_2$ on a volatile free basis, comminuting said mixture by milling the mixture and drying the milled mixture and mixing the dried mixture with an ammonium salt solution at a pH of about 4 to 7 to form a silica gel in situ in the mixture and spray drying said mixture.

11. The process of claims 1, 2, 3, 4, 5, 6, 7, 8, 9, or 10 in which the drying of the mixture is by spray drying in to form microspheres and exchanging the microspheres with cations chosen from the group consisting of mono-valent and poly-valent cations to reduce the sodium content of the composite catalyst to less than about 1% expressed as $Na_2O$ on a volatile free basis.

12. The process of claim 4, 5, 8, 9, or 10 in which the milling raises the temperature of the milled produced in the range of 10° to 20° F.

13. The process of claims 4, 5, 6, 7, 8, 9, or 10 in which the milling raises the temperature of the milled product in a range of about 10° F. to about 20° F. and in which the drying of the mixture is by spray drying in to form microspheres and after gelling the $SiO_2$, exchanging the microspheres containing the $SiO_2$ gel with cations chosen from the group consisting of mono-valent and poly-valent cations to reduce the sodium content of the composite catalyst to less than about 1% expressed as $Na_2O$ on a volatile free basis.

* * * * *